United States Patent

Strack et al.

[11] B 3,914,117
[45] Oct. 21, 1975

[54] METHOD OF MAKING IMPROVED FIBER OPTIC CONDUIT

[75] Inventors: Richard R. Strack, Southbridge, Mass.; Merton L. Smith, Woodstock, Conn.

[73] Assignee: American Optical Corporation, Southbridge, Mass.

[22] Filed: May 10, 1973

[21] Appl. No.: 359,174

[44] Published under the Trial Voluntary Protest Program on January 28, 1975 as document no. B 359,174.

[52] U.S. Cl. .......................... 65/4; 65/3; 65/DIG. 7
[51] Int. Cl.² ................... C03C 23/20; C03C 25/02
[58] Field of Search .......... 65/DIG. 7, 4, 3, 3 A, 3 B

[56] References Cited
UNITED STATES PATENTS

| | | |
|---|---|---|
| 2,995,970 | 8/1961 | Hicks, Jr. et al. ..................... 65/4 X |
| 3,119,678 | 1/1964 | Bazinet, Jr. ..................... 65/DIG. 7 |
| 3,166,395 | 1/1965 | Hicks, Jr. ................................. 65/4 |
| 3,193,363 | 7/1965 | Hicks, Jr. et al. ......................... 65/4 |

*Primary Examiner*—S. Leon Bashore
*Assistant Examiner*—Frank W. Miga
*Attorney, Agent, or Firm*—H. R. Berkenstock, Jr.; William C. Nealon

[57] ABSTRACT

A method of making a length of drawn multifiber conduit of improved optical quality including the steps of heating a section of juxtapositioned optical fibers to a temperature suitable for rapid drawing to reduced cross-sectional size, the volume of materials of said section being sufficient to yield the entire drawn conduit, keeping interstices between the juxtapositioned fibers open adjacent opposite ends of the section for outgasing during the heating step and drawing the heated section rapidly to the cross-sectional size and length desired of the conduit so as to quickly expose the resulting conduit to a chilling atmosphere for immediate quenching and avoidance of internal gas bubble formation.

6 Claims, 4 Drawing Figures

METHOD OF MAKING IMPROVED FIBER OPTIC CONDUIT

BACKGROUND OF THE INVENTION

1. Field of the Invention

Fiber optics with particular reference to the manufacture of drawn multifiber conduit.

2. Description of the Prior Art

Fiber optic conduit is customarily produced by directing a bundle of juxtapositioned optical fibers into an annular heating zone for heating one end of the bundle to a temperature conducive to drawing and then drawing the bundle longitudinally relatively slowly from its heated end while gradually feeding the bundle into the heating zone at a rate corresponding to the rate of removal of material by drawing. This procedure has the advantage of providing for continuous drawing of large supplies of optical fibers but not without the drawback of producing fiber conduit of somewhat less than optimum optical quality. This reference to optical quality is intended to relate only to matters of fiber blemishing by the entrappment of gases and other matter and not to the quality of fiber materials.

Gas bubbles entrapped by the inherently continuously closed drawing end or drawing cone of prior art fiber bundles tend to be carried through the cone into a conduit drawn therefrom and indent adjacent fibers sometimes to the extent of completely cutting off their light-conducting cores. The effected fibers then become poorly conductive to light and, in the worst case, non-conductive. Light reaching blemishes caused by gas bubbles and other inclusions further tends to deflect laterally into adjacent fibers as stray light which degrades optical images transmitted mosaically by the multifiber conduit.

It has been discovered that a principal cause of prior art gas bubble blemishing is inefficient removal of burn-off material and other gases before actual drawing as a result of the heating of fiber bundles progressively along their lengths, to drawing temperatures while one end is permanently hermatically sealed by its drawing cone. Also slow drawing rates produce slow quenching of the drawn conduit which permits the growth of gas bubbles by fiber outgasing after drawing.

A principle object of the present invention is to overcome the difficulties of prior art fiber blemishing by gas bubble entrappment and/or growth in the manufacture of multifiber conduits by employing a method of providing for substantially complete removal of burn-off matter and gases during heating of a multifiber assembly prior to its drawing and preventing appreciable outgasing and growth of bubbles after drawing.

SUMMARY OF THE INVENTION

The foregoing objective and its corollaries are accomplished by first placing a section of a bundle of optical fibers within a large heating zone adapted to receive and heat the whole section to a temperature conducive to drawing wherein the section contains a volume of material sufficient to provide the entire length of conduit desired and interstices between individual fibers of the bundle are kept open at both of its ends during heating. The latter allows burn-off matter and other gases to escape freely from either or both ends of the bundle of fibers. Secondly, when the section of the bundle to be drawn reaches drawing temperature, the conduit is drawn rapidly therefrom to its full length quickly into a substantially cooler surrounding environment, e.g., normal room air, wherewith the conduit becomes rapidly quenched and chilled to prevent further outgasing of its fiber materials and growth of bubbles therewithin.

The present invention deals primarily with the avoidance of gas bubble entrappment in multifiber bundles being prepared for drawing into conduit and further avoids the formation and growth of gas bubbles or similar blemishes in conduit drawn from the bundles. Details of the invention will become more fully understood by reference to the following description taken in conjunction with the accompanying drawings.

IN THE DRAWINGS

FIG. 3 is an illustration, in perspective, of a length of drawn fiber optic conduit, and FIG. 4 is an illustration, partially in cross-section, of another method step which may be performed subsequent to the steps illustrated in FIGS. 1 and 2.

DESCRIPTION OF THE PREFERRED EMBODIMENTS

Figure 1:
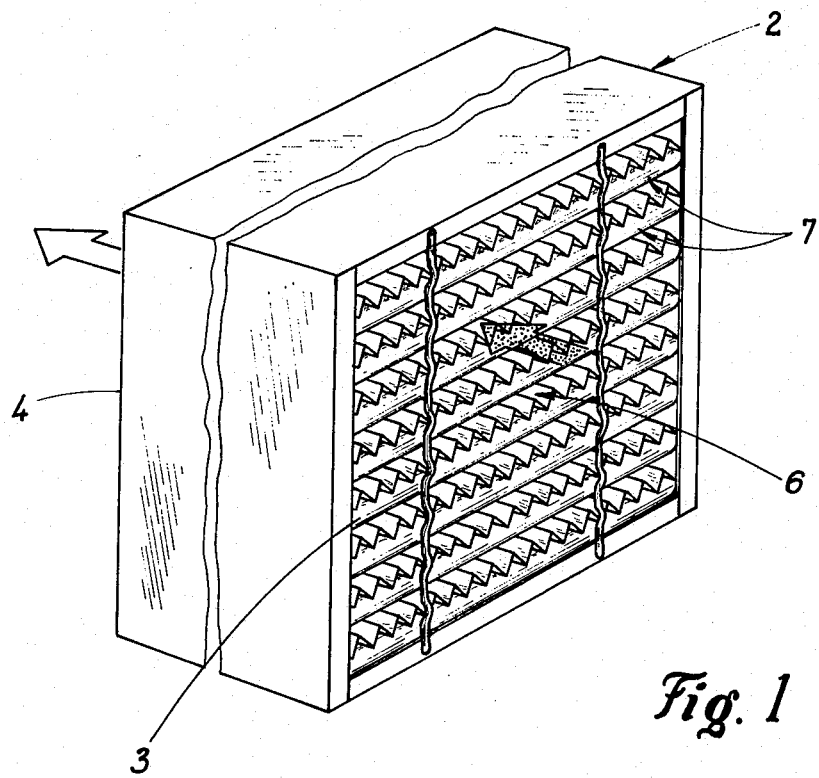
FIGS. 1 and 2 are diagrammatic illustrations, partially in cross-section, of steps employed in the heating, outgasing and drawing of bundles of optical fibers into fused multifiber conduit according to principles of the present invention.
Figure 2:
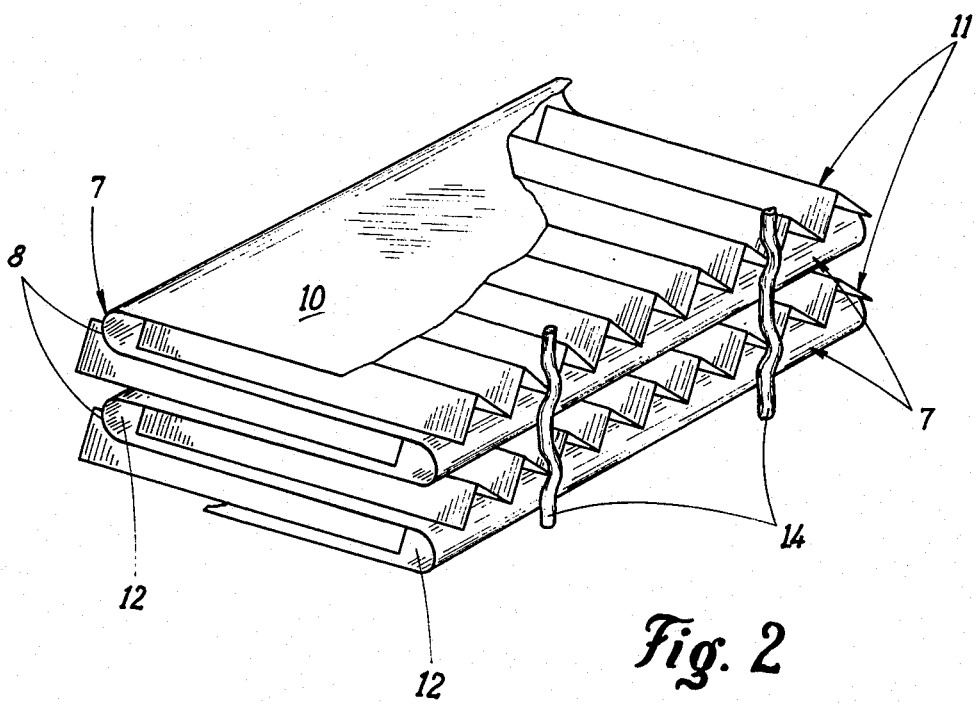

Referring more particularly to FIGS. 1 and 2, it will be seen that fused fiber optic multifiber conduit is produced according to the present invention by first positioning a relatively large section of a bundle 10 of optical fibers 12 within a furnace 14 for heating to a temperature conducive to drawing. The large section of bundle 10 within furnace 14, i.e., the length 1 thereof (FIG. 1), is of a size such as to contain a volume of materials sufficient to produce the entire length of fused fiber optic conduit desired to be drawn.

Furnace 14 is provided with a heating chamber 15 of a size sufficient to contain and uniformly heat the entire length 1 of bundle 10. It is equipped with suitable conventional electrical heating coils 16 and/or gas jets (not shown) which are constructed, arranged and so operated as to produce the uniform heating of the entire length *l* of fiber bundle 10.

Optical fibers 12 are preferably of circular cross-section, and arranged in bundle 10 with interstices therebetween open to the surrounding atmosphere at both ends of the bundle. Thus, during the heating of length *l* of bundle 10 to a temperature suitable for drawing, burn-off of extraneous matter within the bundle and other gases resulting from fiber outgasing are permitted to escape freely outwardly of one or both of the opposite ends of bundle 10 as is diagrammatically illustrated by arrows 18. This avoids the formation and entrappment of gas bubbles within bundle 10.

It should be understood that suction or vacuum means may be applied to either of the open ends of bundle 10, preferably the uppermost end thereof, for assisting in the removal of air and gases from the open-ended interstices.

With bundle 10 held stationary in furnace 14 as depicted in FIG. 1, and having reached a temperature suitable for the drawing of its heated section (length *l*), a suitable clamp 20 (FIG. 1) is firmly applied to the depending end of bundle 10 and moved rapidly in a direction longitudinally of bundle 10 downwardly away therefrom as shown in FIG. 2 to attenuate at least a substantial portion of the length *l* of bundle 10. The drawing temperature of bundle 10 and the extent of drawing, i.e., by movement of clamp 20 away from furnace 14, are controlled according to the final diametrial size desired of the resulting drawn section of bundle 10 which forms fused multifiber conduit 22 (FIG. 2). The rapid drawing of materials of bundle 10 into conduit 22 brings the conduit quickly into the relatively cool atmosphere, usually normal room temperature, which surrounds furnace 14 whereupon the conduit becomes rapidly quenched and chilled to prevent appreciable outgasing of the fiber materials after drawing and the adverse effect of gas bubble growth therewithin.

Those interested in details of the structure of typical optical fibers such as fibers 12 and prior art techniques for forming fused multiple fiber conduit may refer to U.S. Pat. Nos. 2,992,516; 3,004,368; 3,037,241 and 3,148,967.

In the present case of working with a bundle 10 of optical fibers 12 each having a core part of optical flint glass clad which has a high index of refraction with a relatively thin coating of soda-lime glass which has a low index of refraction and numbering anywhere from a relatively few to several hundred in bundle 10 wherein the bundle is approximately 1 inch in diameter, heating of the length *l* of bundle 10 to a temperature of approximately 1,200°F for a period of from approximately 15 to 30 minutes will render the length *l* of the bundle suitably viscous for rapid drawing to a reduced diametrial size of approximately one-sixteenth of an inch as conduit 22. An exemplary drawing rate for effecting the aforementioned size control of conduit 22 and rapid quenching and chilling to prevent internal outgasing of materials of the fibers 12 would be approximately 1 foot per second.

Upon completion of the drawing operation illustrated in FIG. 2 which is performed without movement of bundle 10, conduit 22 is cut away from bundle 10 between the drawing cone 24 thereof and its clamped end 26, e.g. along lines 28a and 28b.

Repeating the operation illustrated in FIGS. 1 and 2 with the same bundle 10 may be accomplished as illustrated in FIG. 4. To this end, cone 24 is cut away from bundle 10 to again render interstices between fibers 12 open at opposite ends of the bundle through which burn-off and other gases may be freely exhausted. With the drawing cone 24 removed and discarded and bundle 10 moved downwardly fully into furnace 14 exposing its lowermost end as illustrated for clamping and redrawing, the previously described drawing operation may be repeated.

The present invention deals with the avoidance of gas bubble entrappment in multiple fiber bundles during their preparation for drawing into a conduit and further obviates the formation and growth of gas bubbles or similar blemishes in conduit drawn from the bundles. The former is accomplished by heating to drawing temperature a volume of materials of bundled together fibers which is sufficient to produce the entire length desired of conduit to be drawn therefrom and keeping interstices between the fibers open at opposite ends thereof for outgasing of burn-off matter and absorbed and adsorbed gases prior to drawing the bundle. The latter is accomplished by rapid drawing of the bundle to conduit size into a relatively cool environment for quickly terminating fiber ougasing and preventing gas bubble growth in the drawn conduit.

Those skilled in the art will appreciate that various modifications of bundle drawing temperatures, fiber bundle sizes, timing of heating cycles, and drawing rates may be made to suit particular requirements. The examples given are for illustration only and are not intended to be restrictive of the invention beyond that necessitated by the following claims.

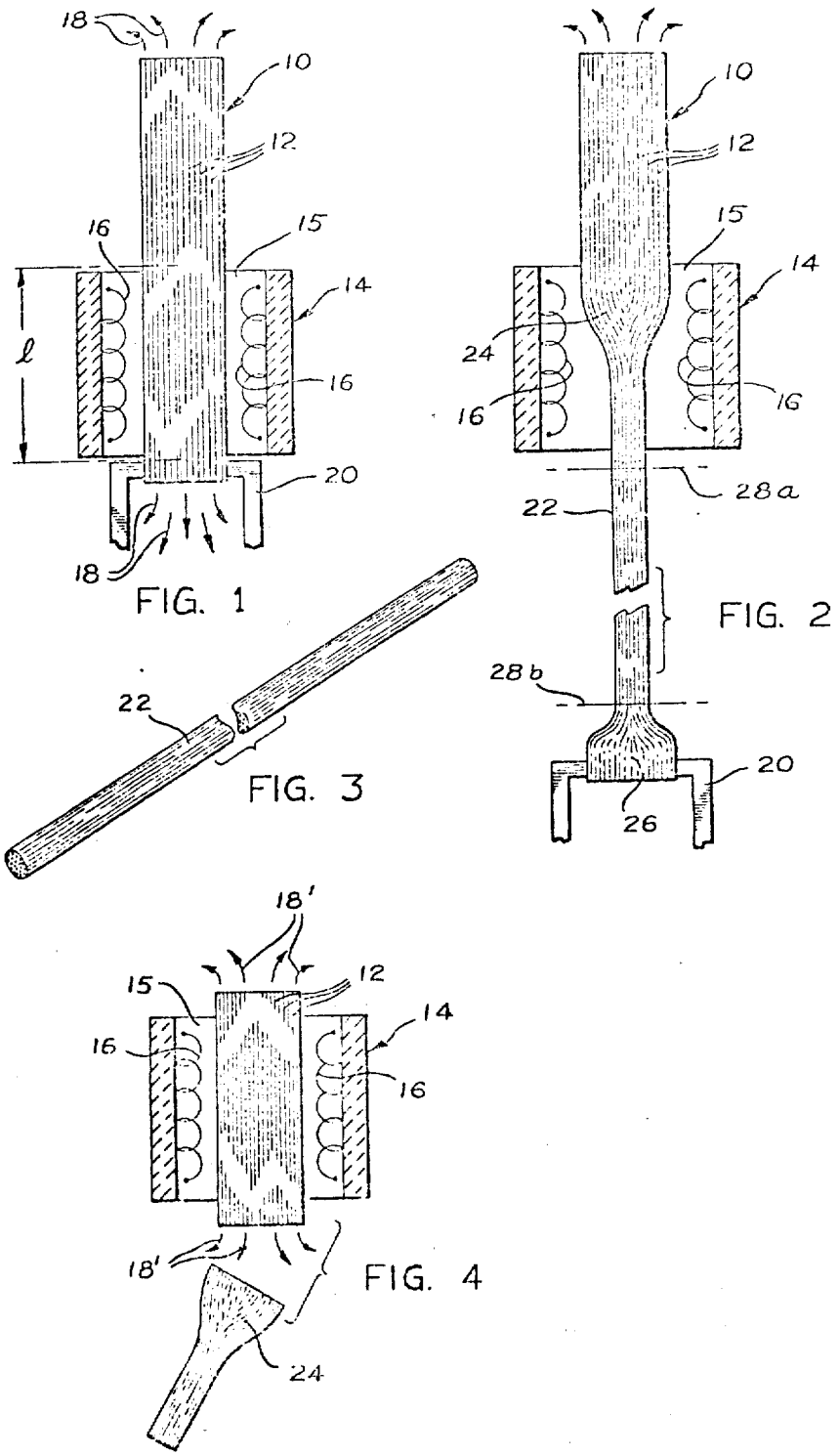

We claim:

1. The method of making a drawn multifiber conduit including the steps of:

substantially uniformly heating a relatively large section of a bundle of juxtapositioned glass clad glass optical fibers having interstices therebetween to a temperature suitable for rapid drawing of at least a substantial portion of said section to the size desired of said multifiber conduit, said substantial portion of said heated section having a sufficient volume of materials to yield at least the entire length and diametrial size desired of said conduit and said interstices being kept open adjacent opposite ends of said section of said bundle for free outgasing thereof continuously during said heating to said drawing temperature, said heated section of said bundle being disposed adjacent to a chilling atmosphere;

holding said bundle of fibers stationary, gripping one of its ends and drawing the heated section thereof rapidly longitudinally into said chilling atmosphere and to the length and cross-sectional size desired of said conduit, said rapidity of drawing being sufficient to substantially immediately quench said drawn conduit in said chilling atmosphere thereby avoiding appreciable interstitial and other internal gas bubble formations.

2. The method according to claim 1 wherein said step of drawing produces a fused drawing cone at each of opposite ends of said drawn conduit and steps of cutting said cones away from said conduit and away from the remaining portion of said bundle of juxtapositioned fibers and discarding said cones are included.

3. The method according to claim 2 further including the steps of heating a section of said remaining portion of said bundle of juxtapositioned optical fibers to a temperature suitable for rapid drawing, said section of said remaining portion of said bundle having a volume of materials sufficient to yield a second multifiber conduit and drawing said heated section of said remaining portion of said bundle rapidly longitudinally into said second multifiber conduit for quickly exposing said second conduit to said chilling atmosphere to avoid appreciable internal gas bubble formation therewithin.

4. The method according to claim 3 wherein said latter step of drawing produces a fused drawing cone at each of opposite ends of said second conduit and steps of cutting said second conduit away from said drawing cones are included.

5. The method according to claim 1 wherein said optical fibers each embody a core section of high refractive index glass clad with a relatively thin layer of low refractive index glass, said section of said bundle of juxtapositioned fibers being of approximately 1 inch in diameter and heated to a temperature of approximately 1,200°F for a period of from approximately 15 to 30 minutes and said step of drawing being effected at a rate of approximately 1 foot per second.

6. The method according to claim 5 wherein said high refractive index glass is a flint glass and said low refractive index glass is a soda-lime glass.

\* \* \* \* \*

UNITED STATES PATENT OFFICE
CERTIFICATE OF CORRECTION

Patent No. 3,914,117            Dated October 21, 1975

Inventor(s) Richard R. Strack et al.      Page 1 of 2

It is certified that error appears in the above-identified patent and that said Letters Patent are hereby corrected as shown below:

Cancel all drawing figures and substitute the drawing figures as shown on the attached sheet.